UNITED STATES PATENT OFFICE.

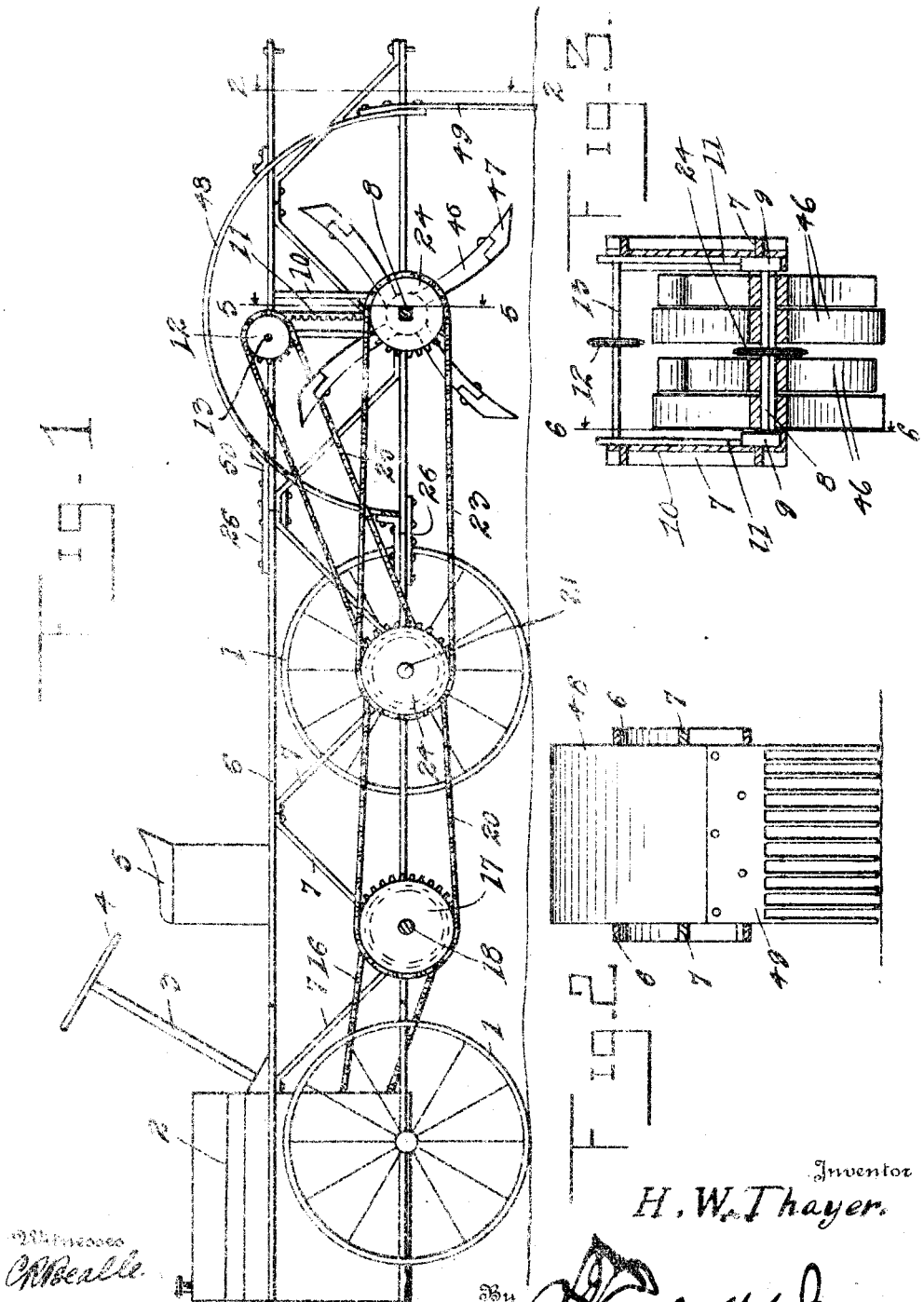

HENRY W. THAYER, OF SYRACUSE, NEW YORK.

COMBINED PLOW AND DRAG.

1,128,916.　　　　Specification of Letters Patent.　　Patented Feb. 16, 1915.

Application filed October 21, 1913. Serial No. 796,502.

*To all whom it may concern:*

Be it known that I, HENRY W. THAYER, a citizen of the United States, residing at Syracuse, in the county of Onondaga and State of New York, have invented certain new and useful Improvements in Combined Plows and Drags; and I do hereby declare the following to be a full, clear, and exact description of the invention, such as will enable others skilled in the art to which it appertains to make and use the same.

This invention relates to combined plows and drags, and one of the principal objects of the invention is to provide a convertible machine for carrying on various operations upon a farm.

Another object of the invention is to provide a combined plow and drag which can be quickly attached to a wagon body and operated to plow a wide furrow or series of furrows and to drag and level the ground after the plow.

Still another object of the invention is to provide a machine for general use on a farm and in which various implements may be connected to and disconnected from a wagon body provided with a suitable motor for operating the various implements, and the motor being capable of use for many purposes around the farm for doing any kind of work requiring motive power.

These and other objects may be attained by means of the construction illustrated in the accompanying drawing, in which, Figure 1 is a longitudinal sectional view of the combined plow and drag, Fig. 2 is a sectional view taken on the line 2—2 of Fig. 1, looking in the direction indicated by the arrows, Fig. 3 is a sectional view taken on the line 5—5 of Fig. 1, looking in the direction indicated by the arrows.

Referring to the drawings the numeral 1 designates the wheels of a wagon, preferably formed of metal in so far as possible, and mounted upon the wagon frame are a motor 2, a steering post 3 and a hand wheel 4, said wagon being provided with a driver's seat 5. This wagon may be utilized for any purposes about a farm and the implements may be readily connected to this wagon and disconnected therefrom whenever required. The driver's seat 5 is supported upon horizontal bars 6 and connected to these bars are inclined braces and supports 7 for the operating mechanism.

The numeral 8 designates a square shaft, having its rounded end journaled in sliding blocks 9 mounted in guide casings 10, and connected to said blocks are racks 11 which extend up and mesh with pinions not shown connected to a horizontal shaft 13. The pinions may be shifted into and out of mesh with the rack bars 11 by means of an ordinary clutch, not shown. The shaft 8 is rotated by means of a drive chain 16 which passes around a sprocket wheel on the motor shaft and around a sprocket 17 on a shaft 18 mounted in the frame of the wagon. Carried by the shaft 18 is a sprocket wheel around which a sprocket chain 20 passes, said chain passing around a sprocket wheel on the rear axle of the wagon and a larger sprocket wheel on said axle is provided with a sprocket chain 23 which passes around a small sprocket wheel 24 on the shaft 8. The shaft 13 is rotated by means of a sprocket chain 25 extending around a sprocket wheel on the shaft 13 and around a similar wheel upon the shaft 21.

The plow and drag are connected to the wagon frame by means of the connector plate 26.

The plow comprises a series of radial members 46 each having a plow point 47 connected thereto and it will be understood that there may be a number of these plows connected to the shaft 8, so that a series of furrows of considerable width will be thrown up as the machine passes over the ground. The depth of the plow points may be regulated by the movement of the sliding blocks 9 and by means of the racks 11 and connected parts.

The drag comprises a series of curved bars 48 having detachable and renewable teeth 49, said teeth, or drag members, being connected to the frame of the machine at 50 and extending over and in rear of the plow.

From the foregoing it will be obvious that a machine made in accordance with this invention will find many uses on a farm and can be readily converted for operation with a variety of implements while the motor may be utilized for any purpose required.

What I claim is:—

1. A combined plow and drag comprising a squared shaft, a series of radially disposed plows connected to said shaft, and a plurality of drag members connected to the frame and curved over and in rear of the plows, said drag members each having detachable teeth.

2. A combined plow and drag comprising a frame mounted on wheels, a shaft, radially disposed plows connected to said shaft, a drag comprising a curved frame extending over the plows provided with a series of spring drag fingers, a motor mounted on the frame and means operated by the motor for rotating the plows.

In testimony whereof I affix my signature in presence of two witnesses.

HENRY W. THAYER.

Witnesses:
DORA WOLFSON,
JANE H. GLAZIER.